US005431018A

United States Patent [19]

Keller

[11] Patent Number: 5,431,018

[45] Date of Patent: Jul. 11, 1995

[54] SECONDARY BURNER HAVING A THROUGH-FLOW HELMHOLTZ RESONATOR

[75] Inventor: Jakob Keller, Redmond, Wash.

[73] Assignee: ABB Research Ltd., Zurich, Switzerland

[21] Appl. No.: 78,031

[22] Filed: Jun. 18, 1993

[30] Foreign Application Priority Data

Jul. 3, 1992 [EP] European Pat. Off. ........... 92111347

[51] Int. Cl.[6] ........................... F02C 3/14; F23R 3/28

[52] U.S. Cl. ........................................ 60/724; 431/114

[58] Field of Search ....................... 60/725, 247, 39.38, 60/39.76, 39.77; 431/114; 181/272, 273, 274

[56] References Cited

U.S. PATENT DOCUMENTS

| | | | |
|---|---|---|---|
| 4,111,279 | 9/1978 | Sterrett | 181/273 |
| 4,409,787 | 10/1983 | Davi et al. . | |
| 4,570,610 | 2/1986 | Himmel | 431/1 |
| 5,123,835 | 6/1992 | Richards et al. | 60/39.76 |

FOREIGN PATENT DOCUMENTS

| | | |
|---|---|---|
| 2414126 | 8/1979 | France . |
| 2570129 | 3/1986 | France . |
| 3324805A1 | 1/1985 | Germany . |
| 3432607C2 | 2/1991 | Germany . |
| 60-213721 | 10/1985 | Japan . |
| 262382 | 6/1949 | Switzerland . |
| 648699 | 1/1951 | United Kingdom . |

*Primary Examiner*—Timothy S. Thorpe
*Attorney, Agent, or Firm*—Burns, Doane, Swecker & Mathis

[57] ABSTRACT

In a secondary burner for a gas turbine combustion chamber, a fuel feed (2, 3) arranged in a combustion chamber wall (1) is surrounded by an annular air duct (4). The air duct (4) communicates, by means of at least one supply tube (5), with a through-flow Helmholtz resonator (6). The outlet from the Helmholtz resonator damping tube (7), which is configured as an annular duct, is located in the region of the burner mouth (8) in the secondary combustion space (9).

4 Claims, 2 Drawing Sheets

FIG. 1
PRIOR ART
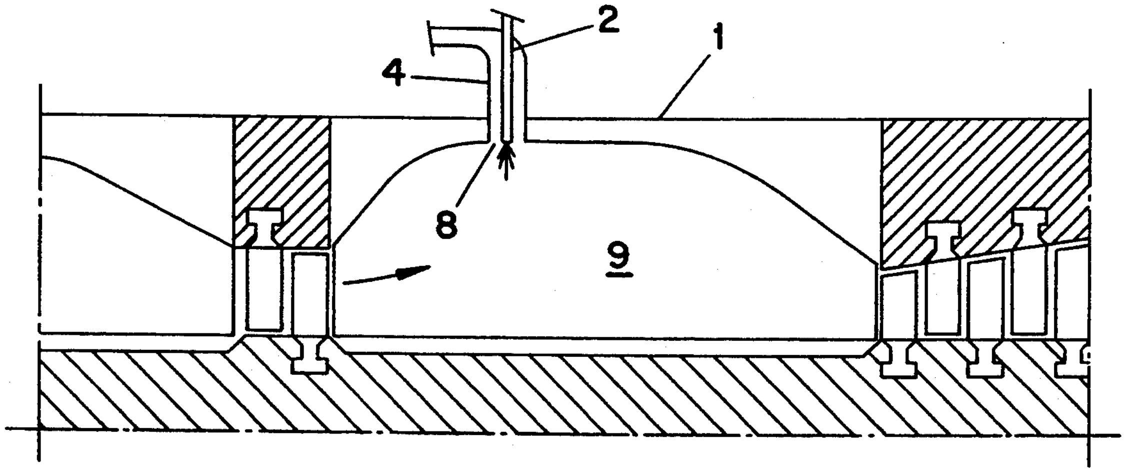
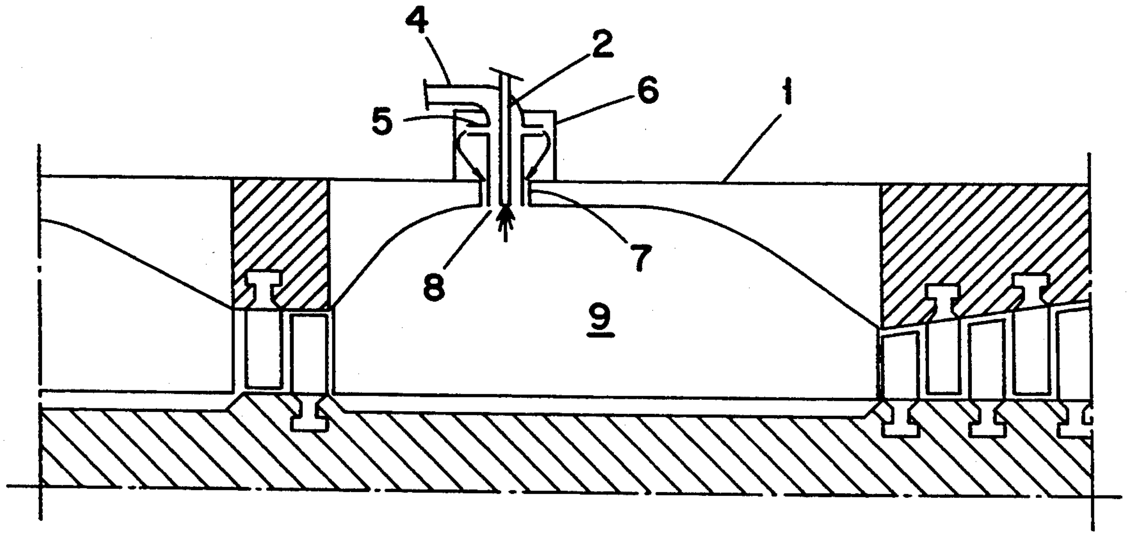
FIG. 2

SECONDARY BURNER HAVING A THROUGH-FLOW HELMHOLTZ RESONATOR

BACKGROUND OF THE INVENTION

1. Field of the Invention

The invention relates to a secondary burner for a gas turbine combustion chamber, for example, in which a fuel feed arranged in a combustion chamber wall is surrounded by an annular air duct.

2. Discussion of Background

Secondary burners in gas turbine combustion chambers are used with advantage where very low-emission combustion of oil or gas is the objective. The gas flow downstream of the normal burner, into which fuel has already been introduced from a primary source, can have an average temperature of approximately 850° C. in this case. In such an environment, fuel which is sprayed in by means of a secondary burner can be ignited sufficiently rapidly. The ignition delay period is so short that the secondary combustion process is initiated over a useful distance, for example between 2 and 10 cm.

In contrast to normal burners, however, secondary burners are not self-sustaining. A flame stabilization zone is deliberately avoided in this case. A secondary burner therefore offers the possibility of converting a very large amount of fuel even at very high velocities, i.e. in very small periods of time. Its advantage lies in the fact that the residence time in a zone which is not perfectly premixed can be kept almost arbitrarily short. It is therefore, possible to mix very rapidly at high velocity.

For this purpose, the fuel or an air/fuel mixture from the secondary burner is, as a rule, blown with a transverse jet into the secondary combustion space, where rapid and homogeneous mixing takes place. This is not possible in the case of conventional burners because the flame stabilization necessary there would be lost.

The dominant problem in a secondary burner is that it is very susceptible to vibration. This is due to the fact that there is no unambiguously defined reaction zone, such as exists in the case of a normal burner. Because reaction zones can be easily influenced by pressure perturbations, such pressure perturbations can lead to large-volume displacements of the reaction in the combustion space and this can lead to very strong vibrations.

SUMMARY OF THE INVENTION

Accordingly, one object of the invention is to suppress thermoacoustically excited vibrations in a secondary burner of the type quoted at the beginning.

According to the invention, this is achieved by the air duct communicating, by means of at least one supply tube, with a through-flow Helmholtz resonator, the outlet from the at least one damping tube of the Helmholtz resonator being located in the region of the burner mouth in the secondary combustion space. The damping system can be effectively integrated in the secondary burner and, because of the simple construction of a secondary burner, the possibility exists of designing the secondary burner itself, or parts of it, as the suppressor.

It is particularly advantageous for the damping tube to be configured as an annular duct. The secondary burner is thus again enclosed in a curtain of air which originates from the Helmholtz resonator. The damping medium flowing out of the damping tube as an annulus into the secondary combustion space is, therefore, a constituent part of the secondary combustion air. The air used for damping purposes is not, therefore, counted as being lost.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a side view of a conventional secondary burner installed in a combustion chamber;

FIG. 2 is side view of a secondary burner according to the present invention installed in a combustion chamber;

Figure 3:
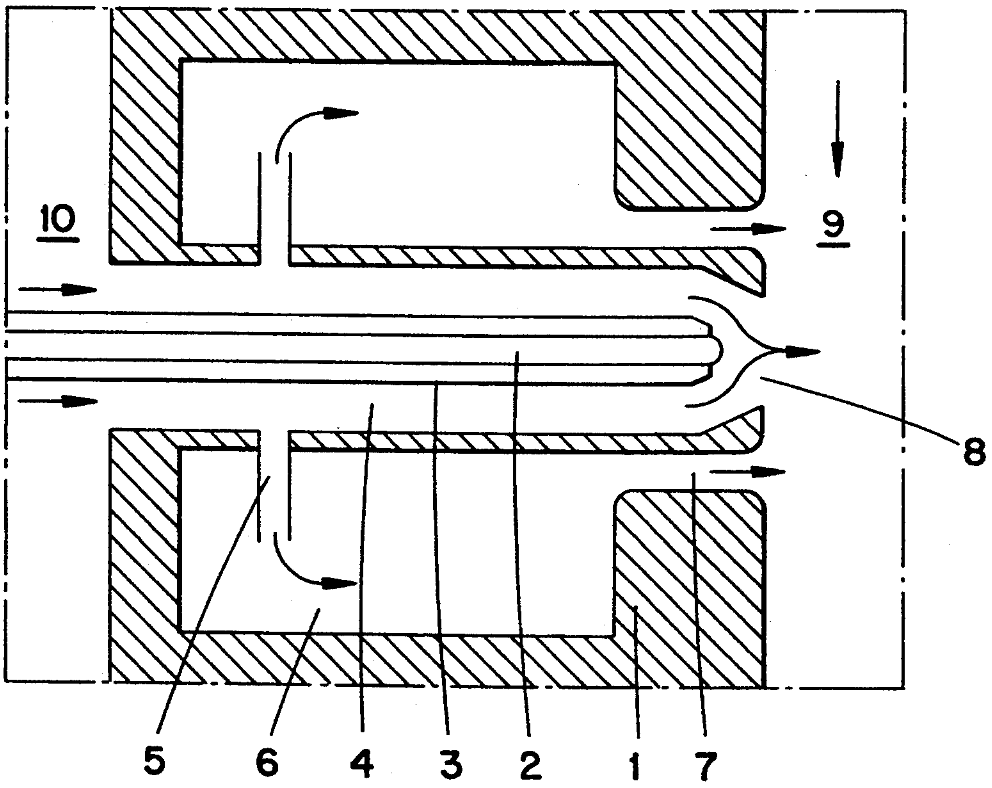
FIG. 3 is an enlarged view of the secondary burner of FIG. 2.

Only the elements essential for understanding the invention are shown. The flow directions of the working media are indicated by arrows.

DESCRIPTION OF THE PREFERRED EMBODIMENTS

Referring now to the drawings, wherein like reference numerals designate identical or corresponding parts throughout the several views, a conventional secondary burner arranged in a combustion chamber wall 1 is represented, in a simplified manner, in FIG. 1. The fuel is sprayed into the secondary combustion space 9 via an oil conduit 2 arranged centrally in the burner and/or via an annular gas lance 3, which surrounds the oil conduit 2. The intention is to mix the fuel into the existing gas quantity very rapidly, on the one hand, and to delay the reaction as long as possible, on the other. This avoids very hot zones being dominant throughout long intervals of time before the mixing process is concluded. In order to avoid the reaction taking place directly in the burner mouth 8, the sprayed-in fuel jet is enveloped by an air shroud. This air shroud is brought to the burner mouth 8 via an air duct 4. The air duct 4 is fed from the collecting space 10 downstream of the compressor (not shown) and surrounds the fuel feeds 2, 3 as an annulus. This air shroud, which feeds the generally necessary secondary combustion air into the combustion space 9, likewise cools the fuel feeds 2, 3.

Secondary burners are, to this extent, known. Referring to the figures to the invention, a scavenged Helmholtz resonator is now to be employed for noise suppression. As shown in FIG. 2, a resonance volume 6 is provided with the secondary burner to dampen vibrations in the combustion chamber 9. As shown in FIG. 2, a volume surrounding the air duct 4 is arranged in the combustion chamber wall 1 so that the secondary burner and the Helmholtz resonator form an integral structural element. The air inlet openings to the Helmholtz volume 6 are configured as supply tubes 5, of which a plurality start from the outer wall of the air duct 4, distributed over the periphery, and protrude into the volume 6. The damping tube 7 of the Helmholtz resonator is configured as an annular duct. The supply tubes 5 preferably have the same length as the damping tube 7. In order to increase the power of the Helmholtz resonator, the ends of the damping tube are rounded at the inlet and the outlet. The outlet of the annular damping tube is located in the immediate region of the burner mouth 8 so that the latter is surrounded by a further annular curtain of air.

The damping location is decisive for the stabilization of a thermoacoustic vibration. The strongest amplification occurs when the reaction rate and the pressure perturbation vibrate in phase. The strongest reaction rate occurs, as a rule, near the center of the combustion zone. The highest reaction rate fluctuation will therefore also be there in the case where a fluctuation takes place. The annular arrangement of the damping tube in the region of the mouth of the secondary burner therefore has the effect that the damping action is achieved at an optimum position.

For functional capability of the Helmholtz resonator, the supply tubes 5 are dimensioned in such a way that they cause a relatively high pressure drop in the entering air. On the other hand, the air reaches the secondary combustion space 9 through the damping tubes 7 with a low residual pressure drop. The limit to the pressure drop in the damping tubes is provided by the requirement that a sufficient scavenging airflow into the secondary combustion space is always ensured even in the case of an uneven pressure distribution on the inside of the combustion chamber wall. Hot gas must not, of course, penetrate in the reverse direction into the Hielmholtz resonator at any point.

For an ideal design, the average flow velocity in the damping tube can, typically, be between 2 and 4 m/s in the present case of a gas turbine combustion chamber. It is therefore very small compared with the vibration amplitude, which means that the air particles have a pulsating forward and rearward motion in the damping tube. In consequence, only just sufficient air is permitted to flow through the resonator to avoid any significant heating of the latter. This is because the resonance, and therefore the damping, become weaker with larger quantities of air.

In consequence, the Helmholtz resonator is dimensioned in such a way that sufficient scavenging is ensured. Heating of the suppressor, and a damping frequency drift caused by it, can be avoided by this means.

The selection of the size of the Helmholtz volume 6 follows from the requirement that the phase angle between the fluctuations of the damping air mass flows through the supply tubes and damping tubes should be greater than or equal to $\pi/2$. In the case of a harmonic vibration with a specified frequency on the inside of the combustion chamber wall, this requirement means that the volume should be at least sufficiently large for the Helmholtz frequency of the resonator (which resonator is formed by the volume 6 and the openings 5 and 7) to at least reach the frequency of the combustion chamber vibration to be suppressed. It also follows from this that the volume of the Helmholtz resonator used is preferably designed for the lowest natural frequency of the secondary combustion space. It is also possible to select an even larger volume. This achieves the effect that a pressure fluctuation on the inside of the secondary combustion space leads to a strongly anti-phase fluctuation of the air mass flow because, of course, the fluctuations of the damping air mass flows through the supply tubes and the damping tubes are now no longer in phase.

Figure 4:
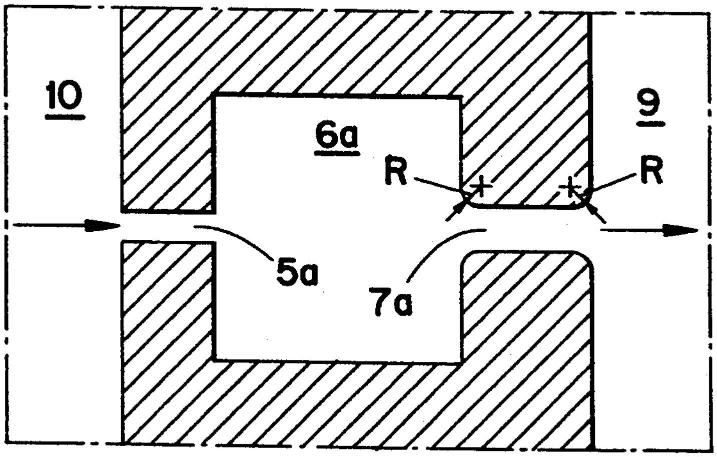
FIG. 4 shows the principle of the Helmholtz resonator.

The fundamental features of a through-flow Helmholtz resonator—such as can be applied in a combustion chamber, but also generally—are represented in FIG. 4. The resonator consists essentially of the supply tube 5*a*, the resonance volume 6*a* and the damping tube 7*a*. The supply tube 5*a* determines the pressure drop. The velocity at the end of the supply tube adjusts itself so that the dynamic pressure of the jet, together with the losses, corresponds to the pressure drop of the combustion chamber. Just sufficient air is supplied to ensure that the inside of the suppressor does not become hotter. Heating due to radiation from the region of the combustion chamber would result in the frequency not remaining stable. The scavenging should therefore only remove the quantity of heat received by radiation. Helmholtz resonators are, to this extent, known.

In order to increase the power of the Helmholtz resonator substantially, it has been found expedient not to embody the two ends of the damping tube 7*a* with sharp edges. The rounding selected has a radius of curvature which satisfies the following condition:

$$Str = \frac{R \cdot f}{u} \gtrsim 0.5$$

in which: Str is the Strouhal number

R is the radius of curvature of the rounding f is the frequency u is the fluctuation rate of the flow in the damping tube This measure has, inter alia, the effect that the flow does not separate fully at the inlet to and the outlet from the damping tube, as is the case with a sharp-edged inlet and outlet. The inlet and outlet losses are lower so that the pulsating flow has substantially lower losses. This low-loss design leads to very high vibration amplitudes which has, in turn, the result that the desired high loss by radiation at the ends of the damping tube is further increased. Expressing the matter otherwise, the growth in the amplitude provides over-compensation for the lowering of the loss coefficient. As a result, a Helmholtz resonator is achieved which has between two and three times the damping power, compared with the through-flow resonators known per se.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A through-flow Helmholtz resonator for a secondary burner in a combustion chamber, comprising:
   - a chamber defining a resonance volume;
   - a supply tube; connecting the resonance volume to an air duct; and
   - a damping tube connecting the resonance volume to a combustion chamber,
   - wherein an inlet end where the damping tube connects to the resonance volume and an outlet end where the damping tube connects to the combustion chamber are formed with a predetermined radius of curvature.

2. A secondary burner for a secondary combustion chamber of a gas turbine, comprising:
   - an air duct communicating with a combustion chamber through a wall of the combustion chamber and forming a burner mouth;
   - a fuel feed conduit to supply fuel to the combustion chamber arranged in the air duct so that an annular air space surrounds the fuel feed conduit;

a through-flow Helmholtz resonator having a resonance volume;

at least one supply tube connecting the resonance volume with the air duct; and a damping tube connecting the resonance volume with the combustion chamber by an outlet through the, wall of the combustion chamber, the outlet formed as an annulus surrounding the burner mouth.

3. The secondary burner as claimed in claim 2, wherein the resonance volume surrounds the air duct.

4. The secondary burner as claimed in claim 2, wherein the damping tube has an inlet end connecting the damping tube to the resonance volume and an outlet end connecting the damping tube to the combustion chamber, the inlet and outlet ends formed with a predetermined radius of curvature.

* * * * *